United States Patent

Schwartz et al.

[11] Patent Number: 5,211,157
[45] Date of Patent: May 18, 1993

[54] PORTABLE FOOD WARMING DEVICE ASSEMBLY

[76] Inventors: Arnold Schwartz; Bong K. Park, both of 7 Rte. 46 West, Lodi, N.J. 07644

[21] Appl. No.: 711,893

[22] Filed: Jun. 7, 1991

Related U.S. Application Data

[63] Continuation-in-part of Ser. No. 537,931, Jun. 13, 1990, abandoned.

[51] Int. Cl.$^5$ ............................................. F24C 3/00
[52] U.S. Cl. .................................. 126/39 E; 431/255; 126/40; 126/52
[58] Field of Search ............ 126/40, 39 E, 52, 39 BA, 126/261, 268, 265; 431/255

[56] References Cited

U.S. PATENT DOCUMENTS

| | | | |
|---|---|---|---|
| 4,348,172 | 9/1982 | Miller | 431/255 |
| 4,829,981 | 5/1989 | Burrell | 126/39 |
| 4,848,310 | 6/1989 | Millington | 126/39 |
| 4,899,722 | 2/1990 | Horewitch | 126/39 |

OTHER PUBLICATIONS

Ranee Ind. Co., Ltd., Seoul, Korea, 1978.
Cassette Feu, A-7, Iwatani Co., Japan, 1978.

*Primary Examiner*—Larry Jones
*Attorney, Agent, or Firm*—Birch, Stewart, Kolasch & Birch

[57] ABSTRACT

A food warming device assembly supported on legs comprises a stand or a frame having a heater supporting shelf for supporting a tray-like food container, an opening disposed in the heater supporting shelf, a gas burner extending into the opening and supported therein by an annular flange, and a control box containing a fuel cartridge connected to the gas burner by means of an automatic piezo-electronic ignition line and a fuel supply line for automatically igniting and controlling the supply of fuel to the gas burner, whereby the food warming device assembly can be used to maintain food in a warm condition in a controlled manner.

8 Claims, 1 Drawing Sheet

PORTABLE FOOD WARMING DEVICE ASSEMBLY

CROSS-REFERENCE TO RELATED APPLICATION

This is a continuation-in-part application of U.S. patent application, Ser. No. 07/537,931, filed on Jun. 13, 1990, which is now abandoned.

BACKGROUND OF THE INVENTION

1. Field of the Invention

The present invention relates to a portable food warming device assembly and more particularly, to an improved food warming device assembly such as chafer assemblies, warming cabinet assemblies, and the like for food service use in restaurants, hotels, dining rooms, institutions, and the like, which includes a stand of the chafer assemblies or a shelf of the warming cabinet assemblies for supporting of a tray-like food container above a support shelf such as a counter top or a plate thereof, a portable gas burner extending into an opening disposed in a heater support shelf and supported by an annular flange operatively associated with the stand or the shelf, and a control box containing a fuel cartridge for automatically igniting the gas burner by means of an auto piezo-electric ignition line and controlling the supply of fuel to the gas burner, whereby the food warming device assembly can be used to maintain food in a warm condition in a controlled manner and improve the safety, environment quality, and cost effectiveness of the replaceable fuel cartridge.

2. Description of the Prior Art

Various types of food warming device assemblies such as chafer assemblies and warming cabinet assemblies are well known in the art. Some prior chafer or warming cabinet assemblies include a supporting stand below a food container, a gas burner having a fuel tank or a burner having a solid fuel as a composite structure, or an electric burner below the food container. Such warming device assemblies suffer from a number of disadvantages such as, for example, such assemblies have a safety problem, a pollution problem, an unreliable thermostating heat, and a high cost control.

Furthermore, it is difficult for the burners for such food warming device assemblies to be readily associated with the stand and shelf of such conventional warming device assemblies. Some prior food warming device assemblies disclose as shown in U.S. Pat. No. 4,829,981 to Burrell, U.S. Pat. No. 4,848,310 to Milligton, and U.S. Pat. No. 4,899,722 to Horewitch. Also, automatic piezo-electric ignition system are well known in the art since 1978. Such automatic piezo-electric ignition systems are disclosed as shown in brochures and products of gas ranges, gas burning devices, and gas cookers supplied from Iwatani Co., Ltd. in Japan and Ranee Ind. Co., Ltd. in Korea. However, these references do not disclose and suggest the use of a portable gas burner assembly having an annular flange and connected to an automatic piezo-electric ignition line and a fuel supply line from a control box, whereby the portable gas burner-fuel supply tank assembly can be easily adapted to any food container for heating the same.

SUMMARY OF THE INVENTION

Accordingly, it is an object of the present invention to provide an improved, portable, food warming device assembly for food service use in restaurants, dining rooms, hotels, and institutions.

Another object of the present invention is to provide a gas burner for heating the food warming device assembly, which enables the control box which contains a fuel cartridge to be positioned at a predetermined distance from the gas burner for igniting the gas by a spark generated by the piezo-electric ignition line.

A further object of the present invention is to provide a chafer assembly which is assembled with a chafing dish, a chafing stand, a portable gas burner operatively associated with the chafing stand, and a control box containing a replaceable fuel cartridge operatively connected to the gas burner by means of an automatic piezo-electric ignition line and a fuel supply line which provides a number of advantages such as a safer storage and use, a precise flame control, a self-sealing fuel cartridge, an extra long burn time per fuel cartridge, no waste of the fuel, a better ecological cleaner burner which produces no unburnt residues, an autoignition system, and a safety shut off system.

Still another object of the present invention is to provide an improved warming cabinet assembly for food room service, which includes a plurality of shelves wherein the lowest shelf of the shelves has a plurality of openings for slidably receiving a gas burner connected to a control box which can be attached to the warming cabinet assembly or can be extended therefrom for safety at a predetermined distance while in use by means of an automatic piezo-electric ignition line and a fuel supply line.

A further object of the present invention is to provide an improved warming assembly which includes a gas burner extending into an opening disposed in a heater supporting shelf of a stand or a frame therefor and supported therein by an annular flange for easily engaging the opening of the heater supporting shelf disposed below a tray-like food container.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a food warming device assembly supported on legs which comprises a stand or a frame having a heater supporting shelf for supporting a tray-like food container, an opening disposed in the heater supporting shelf, a portable gas burner extending into the opening and supported therein by an annular flange, and a control box containing a fuel cartridge connected to the gas burner by means of an automatic piezo-electronic ignition line and a fuel supply line for automatically igniting and controlling the supply of fuel to the gas burner, whereby the food warming device assembly can be used to maintain food in a warm condition in a controlled manner.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
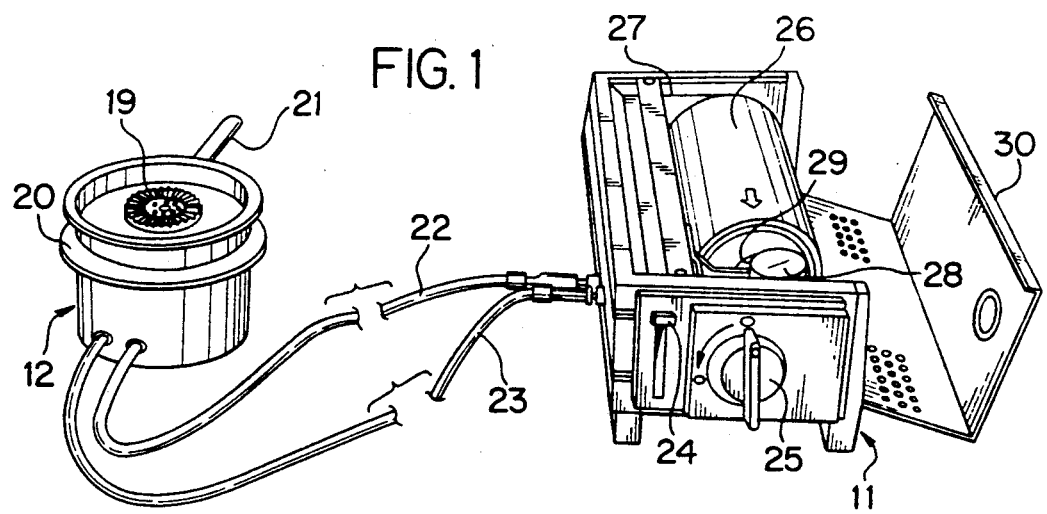
FIG. 1 is a perspective view of the portable gas burner assembled with a control box by means of an automatic piezo-electric ignition line and a fuel supply line according to the present invention wherein the fuel cartridge is removed a predetermined distance from the gas burner through the use of said ignition line and fuel supply line.
Figure 2:
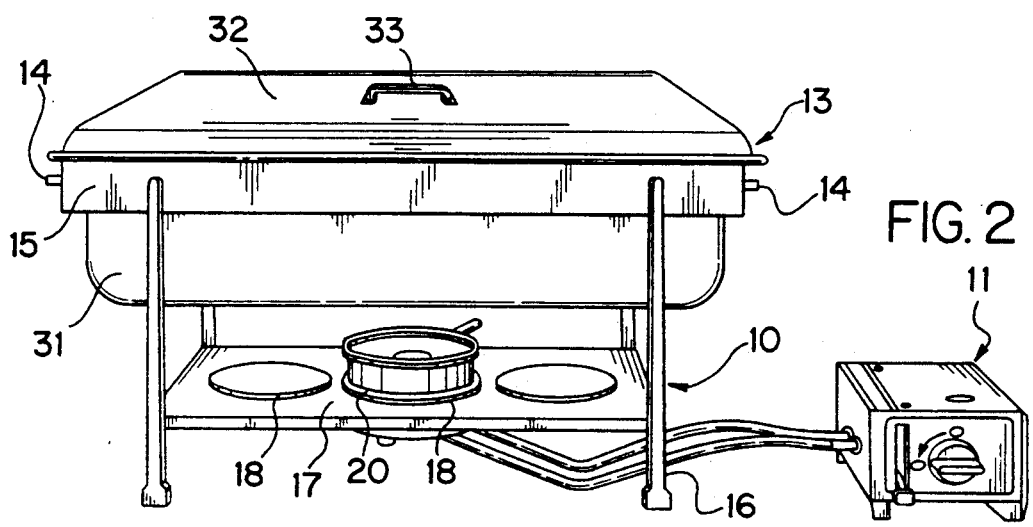
FIG. 2 is a perspective view of the chafer assembly according to the present invention.

Referring now in detail to the drawings for the purpose of illustrating preferred embodiments of the present invention, the food warming device assembly as shown in FIGS. 1 and 2 comprises a warming device frame such as a chafing stand 10 for supporting a tray-like food container such as a chafing dish 13 and a heater supporting shelf 17 disposed below the chafing stand 10, a portable gas burner assembly 12 having an annular flange 20 and extending into an opening 18 disposed in the heater supporting shelf 17, and a control box 11 containing a butane fuel cartridge 26 and connected to the gas burner assembly 12 by means of a fuel supply line 22 and an automatic piezo-electric ignition line 23.

The warming device frame or the chafing stand 10 made of metal includes a counter top frame 15 supported by a plurality of legs 16 and the heater supporting shelf 17 supported by the lower portion of the legs 16. At least one opening 18 is disposed in the heater supporting shelf 17 for easily and tightly engaging the portable gas burner assembly 12 through the annular flange 20 of the gas burner assembly 12. Thus the annular flange 20 of the gas burner assembly 12 can be slidably and tightly mounted to one of the openings 18 of the conventional chafer assemblies so that the gas burner assembly 12, according to the present invention, can be easily replaced for a conventional burner containing solid fuel as a composite structure of the conventional chafer assemblies. The chafing stand 10 is provided with stand handles 14 extending from the counter top frame 15.

As shown in FIG. 1, the portable gas burner assembly 12 having the annular flange 20 includes a burner handle 21 extending from the above portion of the annular flange 20 and a plurality of injection nozzles 19. The gas burner assembly 12 is provided with the fuel supply line 22 for supplying the fuel to the gas burner assembly 12 from the fuel cartridge 26 disposed in the control box 11 and the automatic piezo-electric ignition line 22 for autoigniting the gas burner assembly 12 by operating a combined autoignition switch and fuel control valve 25.

The control box 11 includes the fuel cartridge 26 having a gas outlet 29, for storing butane fuel under pressure therein, a cover 30, and a knob as a combined autoignition switch and fuel control valve 25 having an on/off position for controlling the flow of gas and igniting the gas with a spark. Thus by rotating the switch and control valve 25 in the counterclockwise and clockwise directions to initiate the gas flow and produce a spark gradually, a flame is produced in the gas burner assembly 12 which can be reduced by rotating the switch and control valve 25 in the clockwise direction.

Accordingly, by turning the knob 25 in the counterclockwise direction, the flow of gas is initiated and when a maximum gas flow is attained, the continued rotation of the knob 25 makes contact with a quartz crystal which produces a spark which is carried by the conductive wire line 22 to the gas burner 12 where the gas being separately supported to the gas burner 12 is ignited. The flame can then be controlled to a desired level by rotating the knob 25 in the clockwise. A fuel cartridge locking lever 24 is operatively connected to a clamping device 27 for fixing the fuel cartridge 26 within the control box 11. At this time, a gas outlet 29 is tightly connected to an adaptor 28 so as to transfer the gas in the fuel cartridge 26 with the fuel supply line 23 through the combined autoignition switch and fuel control valve 25.

The chafing dish 13 supported by the chafing stand 14 includes a container 31 for storing food to be maintained food in a warm condition and a cover 32 having a dish handle 33. The chafing dish 13 is made of metal or the like.

Accordingly, because of the portable and simplistic nature, it is easy to assemble and disassemble the food warming device utilizing the separate fuel cartridge 26, the control box 11, the chafing stand 10, the gas burner assembly 12, the piezo-electric ignition line 22, the fuel supply line 23, and the chafing tray 13.

Figure 3:
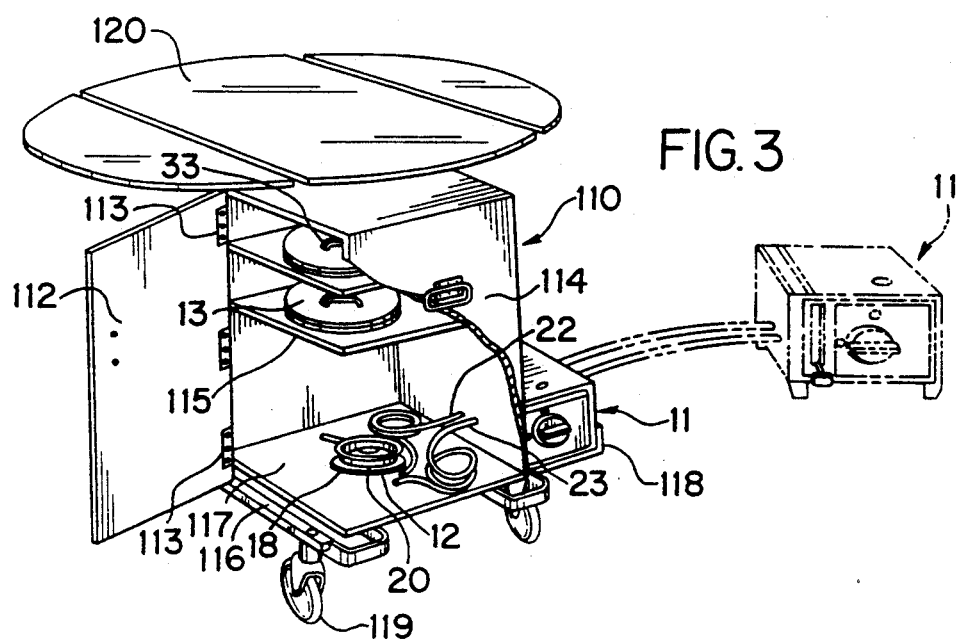
FIG. 3 is a perspective view of the warming cabinet assembly according to the present invention containing cut away portions in order to illustrate the construction of the device of the present invention.

Referring now in detail to FIG. 3, there is illustrated an additional embodiment of a portable warming device assembly of the present invention, the food warming device assembly as shown in FIG. 3 comprises a warming device frame such as a warming cabinet 10 for holding a tray-like food container such as a dish 13 or the like, a plurality of supporting shelves 115 made of metal and a heater supporting shelf 117 disposed therein, a portable gas burner assembly 12 having an annular flange 20 and extending into an opening 18 disposed in the heater supporting shelf 117, and a control box 11 containing the butane fuel cartridge 26 and connected to the gas burner assembly 12 by means of the fuel supply line 22 and the automatic piezo-electric ignition line 23 extending through a rear side wall of the warming cabinet 110.

The warming device frame or the warming cabinet 110 made of metal is supported by a cabinet seating frame 116 with rollers 119 and includes a door 112 with hinges 113 and the heater supporting shelf 17 supported by the lower portion of the seating frame 116. At least one opening 18 is disposed in the heater supporting shelf 117 for easily and tightly engaging the gas burner assembly 12 through the annular flange 20 of the portable gas burner assembly 12. Thus the annular flange 20 of the gas burner assembly 12 can be slidably and tightly mounted to one of the openings 18 of the conventional warming cabinet assemblies so that the gas burner assembly 12 according to the present invention can be easily replaced for a conventional burner containing solid fuel as a composite structure of the conventional chafer assemblies. The warming cabinet 110 is provided with cabinet handles 114 extending from the side walls thereof.

The control box 11 includes the fuel cartridge 26 having the gas outlet 29, for storing butane fuel under pressure therein, the cover 30, and the knob as a combined autoignition switch and fuel control valve 25 having an on/off position for controlling the flow of gas and igniting the gas with a spark. Thus by rotating the switch and control valve 25 in the counterclockwise and clockwise directions to initiate the gas flow and produce a spark gradually, a flame is produced in the gas burner assembly 12 which can be reduced by rotating the switch and control valve 25 in the clockwise direction. Accordingly, by turning the knob 25 in the counterclockwise direction, the flow of gas is initiated and when a maximum gas flow is attained, the continued rotation of the knob 25 makes contact with a quartz crystal which produces a spark which is carried by the conductive wire line 22 to the gas burner 12 where the gas being separately supported to the gas burner 12 is ignited. The flame can then be controlled to a desired level by rotating the knob 25 in the clockwise. The fuel cartridge locking lever 24 is operatively connected to the clamping device 27 for fixing the fuel cartridge 26 within the control box 11. At this time, the gas outlet 29 is tightly connected to the adaptor 28 so as to transfer the gas in the fuel cartridge 26 with the fuel supply line 23 through the combined autoignition switch and fuel control valve 25. Also, since the fuel supply line 22 and the automatic piezo-electric ignition line 23 are long, if necessary, the control box 111 including the fuel cartridge can be removed from the gas burner assembly 12 at a predetermined distance while in use.

A portable table 120 generally is provided with the warming cabinet 110 below the table 120. Also, the plurality tray-like food containers 13 can be stored on the plurality of supporting shelves 115 of the warming cabinet 110.

The portable warming device of the present invention is small in size and effectively replaces the solid fuel (sterno) devices with a system which can be infinitely regulated by controlling the gas supply. It is the first, truly controllable warming system which is matchless, efficient, and leaves no residue.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A portable food heating assembly used in food warming devices which comprises:

at least one portable gas burner assembly, said gas burner assembly containing mounting means for removably mounting said gas burner within the food warming device;

a portable control box separate from said gas burner and containing a fuel cartridge and a piezo-electric element;

a flexible fuel supply line; and a flexible piezo-electric ignition line, said flexible fuel supply line and said flexible piezo-electric ignition line being removably connected to said portable control box for controlling the supply of fuel to said gas burner and igniting the gas at said gas burner, wherein the fuel line and the flexible ignition line form elements of the circuit to conduct the spark generated by the piezo-electric element to the burner so that the portable gas burner assembly can be selectively separated a predetermined distance from the portable control box containing said fuel cartridge so that the heating assembly can readily adapt to the environment in which it is used.

2. The portable food heating assembly of claim 1, wherein said fuel cartridge contains butane fuel stored therein under pressure.

3. The portable food heating assembly of claim 1, wherein said control box contains a clamping device which is operatively connected to a locking lever, whereby upon the engaging of the locking lever, the clamping device fixedly connects the fuel cartridge to the gas supply line and ignition line within said control box.

4. The portable food heating assembly of claim 1 wherein said portable gas burner assembly has an injection nozzle disposed at a head portion thereof.

5. The portable food heating assembly of claim 1, wherein the food warming device is a chafing dish containing a supporting shelf disposed therebelow, said supporting self containing an aperture in which said portable gas burner assembly is removably mounted.

6. The portable food heating assembly of claim 5, wherein said portable gas burner assembly is provided with an annular flange as the mounting means to facilitate its support within said aperture.

7. The portable food heating assembly of claim 1, wherein the food warming device is a warming cabinet containing a plurality of food warming shelves, said warming cabinet further containing a supporting shelf containing an aperture in which said portable gas burner assembly is removably mounted.

8. The portable food heating assembly of claim 7 wherein said portable gas burner assembly is provided with an annular flange as the mounting means to facilitate its support within said aperture.

* * * * *